(12) United States Patent
McNeil et al.

(10) Patent No.: US 10,684,622 B2
(45) Date of Patent: Jun. 16, 2020

(54) VEHICLE DYNAMICS MONITOR FOR AUTONOMOUS VEHICLE

(71) Applicant: UATC, LLC, San Francisco, CA (US)

(72) Inventors: Sean McNeil, Clarkston, MI (US);
Aaron L. Greenfield, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 320 days.

(21) Appl. No.: 15/882,294

(22) Filed: Jan. 29, 2018

(65) Prior Publication Data

US 2019/0155289 A1 May 23, 2019

Related U.S. Application Data

(60) Provisional application No. 62/589,701, filed on Nov. 22, 2017.

(51) Int. Cl.
*G01C 22/00* (2006.01)
*G05D 1/02* (2020.01)
*G05D 1/00* (2006.01)
*B60W 40/02* (2006.01)

(52) U.S. Cl.
CPC .......... *G05D 1/0214* (2013.01); *B60W 40/02* (2013.01); *G05D 1/0088* (2013.01); *G05D 1/0276* (2013.01)

(58) Field of Classification Search
CPC .... G05D 1/0214; G05D 1/0088; B60W 40/02
See application file for complete search history.

(56) References Cited

U.S. PATENT DOCUMENTS

2015/0143913 A1* 5/2015 Adams ................ G01N 33/227
73/655
2019/0155289 A1* 5/2019 McNeil ................ B60W 40/02

\* cited by examiner

*Primary Examiner* — Adam M Alharbi
(74) *Attorney, Agent, or Firm* — Dority & Manning, P.A.

(57) ABSTRACT

The present disclosure is directed to a vehicle dynamics monitor for an autonomous vehicle. In particular, the systems and methods of the present disclosure can determine, based on data received from one or more sensors of an autonomous vehicle, that an anomaly exists in an interface between at least one tire of the autonomous vehicle and a road surface. Responsive to determining that the anomaly exists: a motion plan for the autonomous vehicle that takes into account the anomaly can be determined; and one or more controls of the autonomous vehicle can be interfaced with to implement the motion plan.

17 Claims, 6 Drawing Sheets

VEHICLE DYNAMICS MONITOR FOR AUTONOMOUS VEHICLE

PRIORITY CLAIM

This application claims priority to U.S. Patent Application Ser. No. 62/589,701, filed Nov. 22, 2017, and entitled "VEHICLE DYNAMICS MONITOR FOR AUTONOMOUS VEHICLE," the disclosure of which is incorporated by reference herein in its entirety.

FIELD

The present disclosure relates generally to autonomous vehicles. More particularly, the present disclosure relates to a vehicle dynamics monitor for an autonomous vehicle.

BACKGROUND

An autonomous vehicle is a vehicle that is capable of sensing its environment and navigating with minimal or no human input. In particular, an autonomous vehicle can observe its surrounding environment using a variety of sensors and identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include determining, based on data received from one or more sensors of an autonomous vehicle, that an anomaly exists in an interface between at least one tire of the autonomous vehicle and a road surface. The method can include, responsive to determining that the anomaly exists: determining a motion plan for the autonomous vehicle that takes into account the anomaly; and interfacing with one or more controls of the autonomous vehicle to implement the motion plan.

Another example aspect of the present disclosure is directed to another computer-implemented method. The method can include receiving, by a computing system of an autonomous vehicle and from a remotely located computing system, data indicating a geographic location at which a different autonomous vehicle determined that an anomaly existed in an interface between at least one tire of the different autonomous vehicle and a road surface associated with the geographic location. The method can include, responsive to determining, by the computing system of the autonomous vehicle, that the autonomous vehicle is proximate to the geographic location: determining, by the computing system of the autonomous vehicle, a motion plan for the autonomous vehicle that takes into account the anomaly; and interfacing, by the computing system of the autonomous vehicle, with one or more controls of the autonomous vehicle to implement the motion plan.

A further example aspect of the present disclosure is directed to a further computer-implemented method. The method can include determining, based on data received from one or more sensors of an autonomous vehicle, that an anomaly exists in an interface between at least one tire of the autonomous vehicle and a road surface. The method can include, responsive to determining that the anomaly exists, communicating, to a remotely located computing system and for use by a different autonomous vehicle in generating a motion plan that takes into account the anomaly, data indicating the anomaly and a geographic location of the autonomous vehicle associated with the anomaly.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
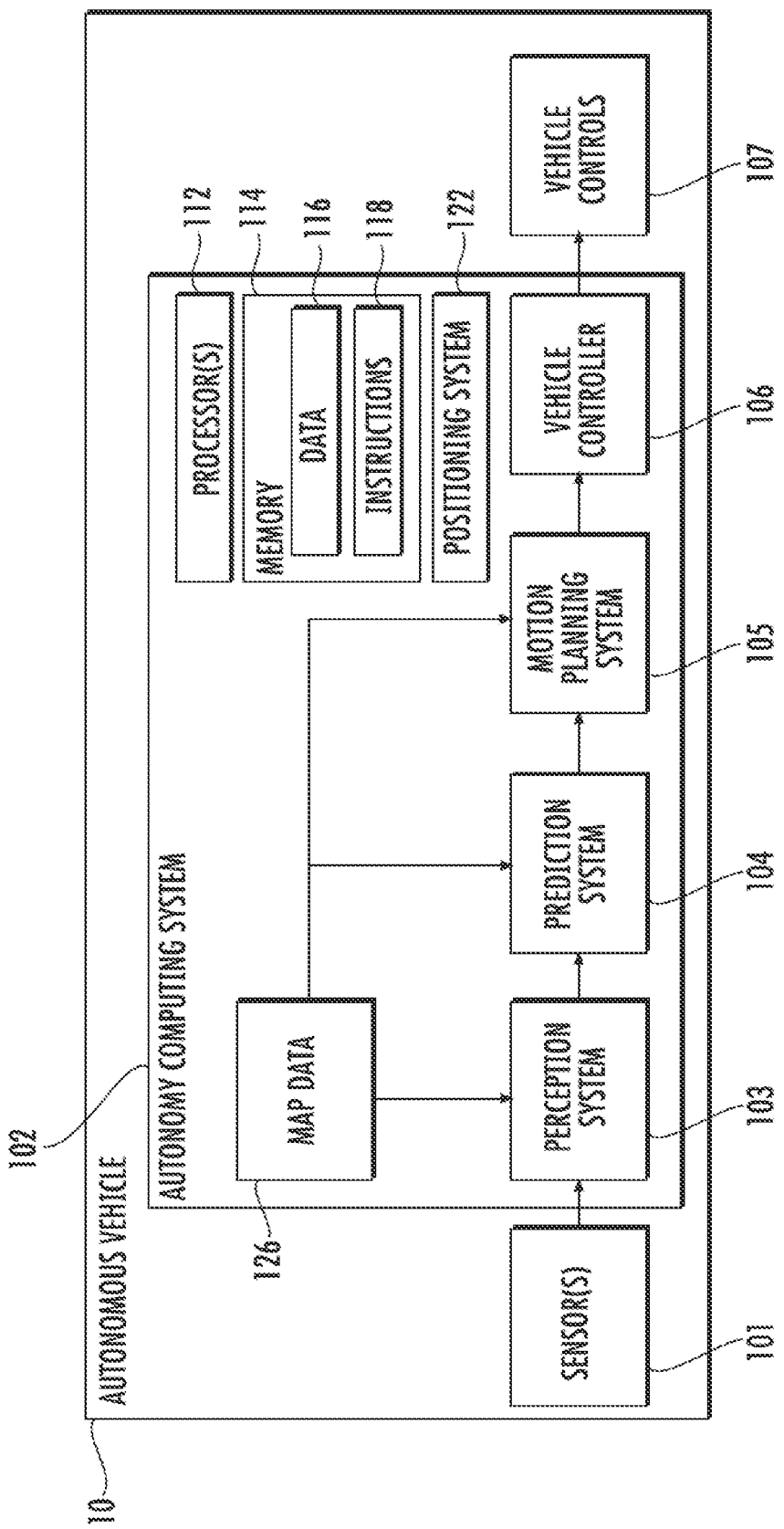
FIG. 1 depicts an example autonomous vehicle according to example embodiments of the present disclosure.

Example aspects of the present disclosure are directed to a vehicle dynamics monitor for an autonomous vehicle. In particular, an autonomous vehicle can determine that an anomaly exists in an interface between at least one tire of the autonomous vehicle and a road surface. The autonomous vehicle and/or a different autonomous vehicle can determine one or more motion plans that take into account the anomaly, and the autonomous vehicle(s) can interface with one or more vehicle controls to implement the motion plan(s).

For example, an anomaly can exist in an interface between a tire of an autonomous vehicle and a road surface that causes a reduced coefficient of friction to exist for the tire (e.g., due to gravel, sand, oil, water, ice, snow, and/or the like). Additionally or alternatively, an anomaly can exist in an interface between a tire of an autonomous vehicle and a road surface due to a wheel associated with the tire being locked up or spinning out, the autonomous vehicle hydroplaning, the tire being flat or underinflated, the autonomous vehicle striking a pothole or curb, a steering system of the autonomous vehicle being misaligned, a suspension system of the autonomous vehicle being mistuned, and/or the like.

Responsive to determining that such an anomaly exists, the autonomous vehicle can determine a motion plan that takes into account the anomaly and can interface with one or more vehicle controls of the autonomous vehicle to implement the motion plan. For example, the autonomous vehicle can determine a maximum lateral acceleration for the autonomous vehicle to prevent the autonomous vehicle from exceeding its frictional capabilities (e.g., of the tire for which the anomaly exists, and/or the like). A motion plan can then be determined based on the maximum lateral acceleration, and the autonomous vehicle can interface with its vehicle controls to implement the motion plan. In some embodiments, the motion plan can represent one or more simulated responses of a human driver to the anomaly.

The autonomous vehicle can determine that the anomaly exists based on data received from one or more sensors of the autonomous vehicle. For example, in some embodiments, the data received from the sensor(s) can include a measured yaw rate of the autonomous vehicle (e.g., as determined by an inertial motion unit (IMU) of the autonomous vehicle, and/or the like). The autonomous vehicle can be configured to obtain and/or determine (e.g., iteratively, repeatedly, continuously, and/or the like) a yaw-rate model for the autonomous vehicle. The measured yaw rate can be compared to a yaw rate indicated by the yaw-rate model (e.g., a yaw rate indicated by the model corresponding to a time when the measured yaw rate was measured, and/or the like), and a difference between the measured yaw rate and the yaw rate indicated by the yaw-rate model can be determined. In such embodiments, the autonomous vehicle can determine that an anomaly exists based on a determination that the difference between the measured yaw rate and the yaw rate indicated by the yaw-rate model exceeds a predetermined threshold.

Additionally or alternatively, the data received from the sensor(s) of the autonomous vehicle can include speed data for one or more wheels of the autonomous vehicle. The autonomous vehicle can be configured to determine wheel speeds for the autonomous vehicle based on the speed data, a curvature of a path of the autonomous vehicle, torque being applied to one or more axels of the autonomous vehicle, and/or the like. The autonomous vehicle can determine that an anomaly exists based on a determination of a deviation in wheel speed (e.g., of a wheel associated with the at least one tire, and/or the like). For example, a flat or underinflated tire can have a higher rotational speed to compensate for its reduced radius, and the autonomous vehicle can determine that a steady-state offset exists in the wheel speeds, suggesting a flat or underinflated tire.

Certain anomalies can potentially impact other autonomous vehicles. For example, a reduced coefficient of friction (e.g., due to gravel, sand, oil, water, ice, snow, and/or the like) could impact other autonomous vehicles that encounter an associated underlying condition. Similarly, a determination that a wheel (e.g., associated with the at least one tire, and/or the like) locked up or spun out, that the autonomous vehicle hydroplaned, that the autonomous vehicle struck a pothole or curb, and/or the like could impact other autonomous vehicles. Accordingly, the autonomous vehicle can be configured to determine a geographic location associated with the anomaly and communicate data indicating the anomaly and/or the geographic location to a remotely located computing system. For example, the autonomous vehicle can be part of a fleet of autonomous vehicles, and the remotely located computing system can be associated with the fleet (e.g., an operator of the fleet, a manufacturer of autonomous vehicles in the fleet or one or more of their components, a software developer associated with the fleet, a third-party associated with the fleet, and/or the like).

The remotely located computing system can receive the data from the autonomous vehicle and generate and/or store one or more records (e.g., in a database, and/or the like) indicating the anomaly, the geographic location, and/or the like. For example, the data can indicate the autonomous vehicle experienced a reduced coefficient of friction (e.g., due to ice, and/or the like) at a particular geographic location (e.g., associated with specified geographic coordinates, and/or the like), and the remotely located computing system can generate and/or store one or more records indicating that the autonomous vehicle experienced the reduced coefficient of friction at the particular geographic location. In some embodiments, the remotely located computing system can determine a decay factor (e.g., a rate at which the data will progress to an invalid status, and/or the like) and/or an expiration date (e.g., a time at which the data will no longer be considered valid, and/or the like) for the anomaly and/or the geographic location and can store this data in the record(s) as well, configure the record(s) accordingly, and/or the like.

As indicated above, the autonomous vehicle can be associated with one or more other autonomous vehicles (e.g., as part of a fleet of autonomous vehicles, and/or the like), and the other autonomous vehicle(s) could be impacted by the anomaly. Accordingly, the remotely located computing system can communicate data indicating the anomaly and/or the geographic location to the other autonomous vehicle(s) (e.g., as part of a software update, via an over-the-air update, in response to the other autonomous vehicle(s) being routed to a location that comprises the geographic location associated with the anomaly, and/or the like).

One of the other autonomous vehicle(s) can receive the data indicating the anomaly and/or the geographic location and can subsequently determine that it is proximate to the geographic location. Responsive to determining that it is proximate to the geographic location, the other autonomous vehicle can determine a motion plan that takes into account the anomaly and can interface with one or more of its vehicle controls to implement the motion plan. For example, the other autonomous vehicle can determine that it is proximate to the geographic location where the original autonomous vehicle determined an anomaly existed (e.g., experienced a reduced coefficient of friction, and/or the like), can determine a motion plan that takes into account the anomaly (e.g., can determine a maximum lateral acceleration to prevent it from exceeding its friction capabilities in light of a condition (e.g., ice and/or the like) underlying the reduced coefficient of friction previously experienced by the original autonomous vehicle, and/or the like), and can interface with one or more of its vehicle controls to implement the motion plan.

The systems and methods described herein can provide a number of technical effects and benefits. For example, the systems and methods described herein can enable an autonomous vehicle to take into account anomalies determined to exist by the autonomous vehicle and/or by other autonomous vehicles, thereby increasing passenger comfort and safety. Additionally, by simulating the responses of a human driver to determined anomalies, the systems and methods described herein can enable an autonomous vehicle to approach, meet, or exceed the comfort and/or safety levels associated with conventionally driven vehicles, offering automated driving at a higher level than that provided by traditional traction-control systems, and the like.

With reference now to the Figures, example embodiments of the present disclosure will be discussed in further detail.

FIG. 1 depicts a block diagram of an example autonomous vehicle according to example embodiments of the present disclosure. Referring to FIG. 1, autonomous vehicle 10 can be capable of sensing its environment and/or navigating without human input. Autonomous vehicle 10 can be a ground-based autonomous vehicle (e.g., car, truck, bus, and/or the like), an air-based autonomous vehicle (e.g., airplane, drone, helicopter, and/or the like), or other type of vehicle (e.g., watercraft, and/or the like).

Autonomous vehicle 10 can include one or more sensors 101, autonomy computing system 102, and one or more vehicle controls 107. Autonomy computing system 102 can assist in controlling autonomous vehicle 10. In particular, autonomy computing system 102 can receive sensor data from sensor(s) 101, attempt to comprehend the surrounding environment by performing various processing techniques on data collected by sensor(s) 101, and/or generate an appropriate motion path through such surrounding environment. Autonomy computing system 102 can control vehicle control(s) 107 to operate autonomous vehicle 10 according to the motion path.

Autonomy computing system 102 can include one or more processors 112 and memory 114. Processor(s) 112 can be any suitable processing device (e.g., a processor core, a microprocessor, an application-specific integrated circuit (ASIC), a field-programmable gate array (FPGA), a controller, a microcontroller, and/or the like) and/or can be one processor or a plurality of processors that are operatively connected. Memory 114 can include one or more non-transitory computer-readable storage media, such as random-access memory (RAM), read-only memory (ROM), electrically erasable programmable read-only memory (EEPROM), erasable programmable read-only memory (EPROM), one or more memory devices, flash memory devices, combinations thereof, and/or the like.

Memory 114 can store information that can be accessed by processor(s) 112. For example, memory 114 (e.g., one or more non-transitory computer-readable storage mediums, memory devices, and/or the like) can store data 116 that can be obtained, received, accessed, written, manipulated, created, and/or stored. In some implementations, autonomy computing system 102 can obtain data from one or more memory devices that are remote from autonomy computing system 102.

Memory 114 can also store computer-readable instructions 118 that can be executed by processor(s) 112. Instructions 118 can be software written in any suitable programming language and/or can be implemented in hardware. Additionally or alternatively, instructions 118 can be executed in logically and/or virtually separate threads on processor(s) 112.

For example, memory 114 can store instructions 118, which when executed by processor(s) 112 can cause autonomy computing system 102 to perform one or more of the operations and/or functions described herein.

In some implementations, autonomy computing system 102 can further include positioning system 122. Positioning system 122 can determine a current position of vehicle 10. Positioning system 122 can be any device and/or circuitry for analyzing the position of vehicle 10. For example, positioning system 122 can determine position by using one or more of inertial sensors, a satellite positioning system, based on IP address, by using triangulation and/or proximity to network access points and/or other network components (e.g., cellular towers, WiFi access points, and/or the like) and/or other suitable techniques. The position of vehicle 10 can be used by various systems of autonomy computing system 102.

Autonomy computing system 102 can include perception system 103, prediction system 104, and motion planning system 105 that cooperate to perceive the dynamic surrounding environment of autonomous vehicle 10 and/or determine a motion plan for controlling the motion of autonomous vehicle 10 accordingly.

In particular, in some implementations, perception system 103 can receive sensor data from sensor(s) 101 that are coupled to or otherwise included within autonomous vehicle 10. As examples, sensor(s) 101 can include a light detection and ranging (LIDAR) system, a radio detection and ranging (RADAR) system, one or more cameras (e.g., visible spectrum cameras, infrared cameras, and/or the like), and/or other sensors. The sensor data can include information that describes the location and/or velocity vector of objects within the surrounding environment of autonomous vehicle 10.

As one example, for a LIDAR system, the sensor data can include the relative location (e.g., in three-dimensional space relative to the LIDAR system) of a number of points that correspond to objects that have reflected a ranging laser. For example, a LIDAR system can measure distances by measuring the interference between outgoing and incoming light waves and by measuring the time of flight (TOF) that it takes a short laser pulse to travel from the sensor to an object and back, calculating the distance based on the TOF with the known speed of light, and based on the phase-shift with known wave-length.

As another example, for a RADAR system, the sensor data can include the relative location (e.g., in three-dimensional space relative to the RADAR system) of a number of points that correspond to objects that have reflected a ranging radio wave. For example, radio waves (pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

Thus, sensor(s) 101 can be used to collect sensor data that includes information that describes the location (e.g., in three-dimensional space relative to autonomous vehicle 10) of points that correspond to objects within the surrounding environment of autonomous vehicle 10.

In addition to the sensor data, perception system 103 can retrieve and/or otherwise obtain map data 126 that provides detailed information about the surrounding environment of autonomous vehicle 10. Map data 126 can provide information regarding: the identity and location of different travelways (e.g., roadways), road segments, buildings, or other static items or objects (e.g., lampposts, crosswalks, curbing, and/or the like); the location and directions of traffic lanes (e.g., the location and direction of a parking lane, a turning lane, a bicycle lane, or other lanes within a particular roadway and/or other travelway); traffic control data (e.g., the location and instructions of signage, traffic lights, and/or other traffic control devices); and/or any other map data that provides information that assists autonomy computing system 102 in comprehending and perceiving its surrounding environment and its relationship thereto.

Perception system 103 can identify one or more objects that are proximate to autonomous vehicle 10 based on sensor data received from sensor(s) 101 and/or map data 126. In particular, in some implementations, perception system 103 can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information.

In some implementations, perception system 103 can determine state data for each object over a number of iterations. In particular, perception system 103 can update the state data for each object at each iteration. Thus, perception system 103 can detect and track objects (e.g., vehicles) that are proximate to autonomous vehicle 10 over time.

Prediction system 104 can receive the state data from perception system 103 and predict one or more future locations for each object based on such state data. For example, prediction system 104 can predict where each object will be located within the next five seconds, ten seconds, twenty seconds, and/or the like. As one example, an object can be predicted to adhere to its current trajectory according to its current speed. As another example, other, more sophisticated prediction techniques and/or modeling can be used.

Motion planning system 105 can determine a motion plan for autonomous vehicle 10 based at least in part on the predicted one or more future locations of the objects and/or the state data of the objects provided by perception system 103. Stated differently, given information about the current locations of objects and/or predicted future locations of proximate objects, motion planning system 105 can determine a motion plan for autonomous vehicle 10 that best navigates autonomous vehicle 10 relative to the objects at such locations. Motion planning system 105 can provide the selected motion plan to vehicle controller 106, which can directly and/or indirectly control one or more vehicle actuators via vehicle control(s) 107 (e.g., actuators and/or other devices that control gas and/or power flow, steering, braking, and/or the like) to execute the selected motion plan.

Each of perception system 103, prediction system 104, motion planning system 105, and vehicle controller 106 can include computer logic utilized to provide desired functionality. In some implementations, each of perception system 103, prediction system 104, motion planning system 105, and vehicle controller 106 can be implemented in hardware, firmware, and/or software controlling a general purpose processor. For example, in some implementations, each of perception system 103, prediction system 104, motion planning system 105, and vehicle controller 106 includes program files stored on a storage device, loaded into a memory and executed by one or more processors. In other implementations, each of perception system 103, prediction system 104, motion planning system 105, and vehicle controller 106 includes one or more sets of computer-executable instructions stored in a tangible computer-readable storage medium such as RAM, hard disk, and/or optical or magnetic media.

Figure 2:
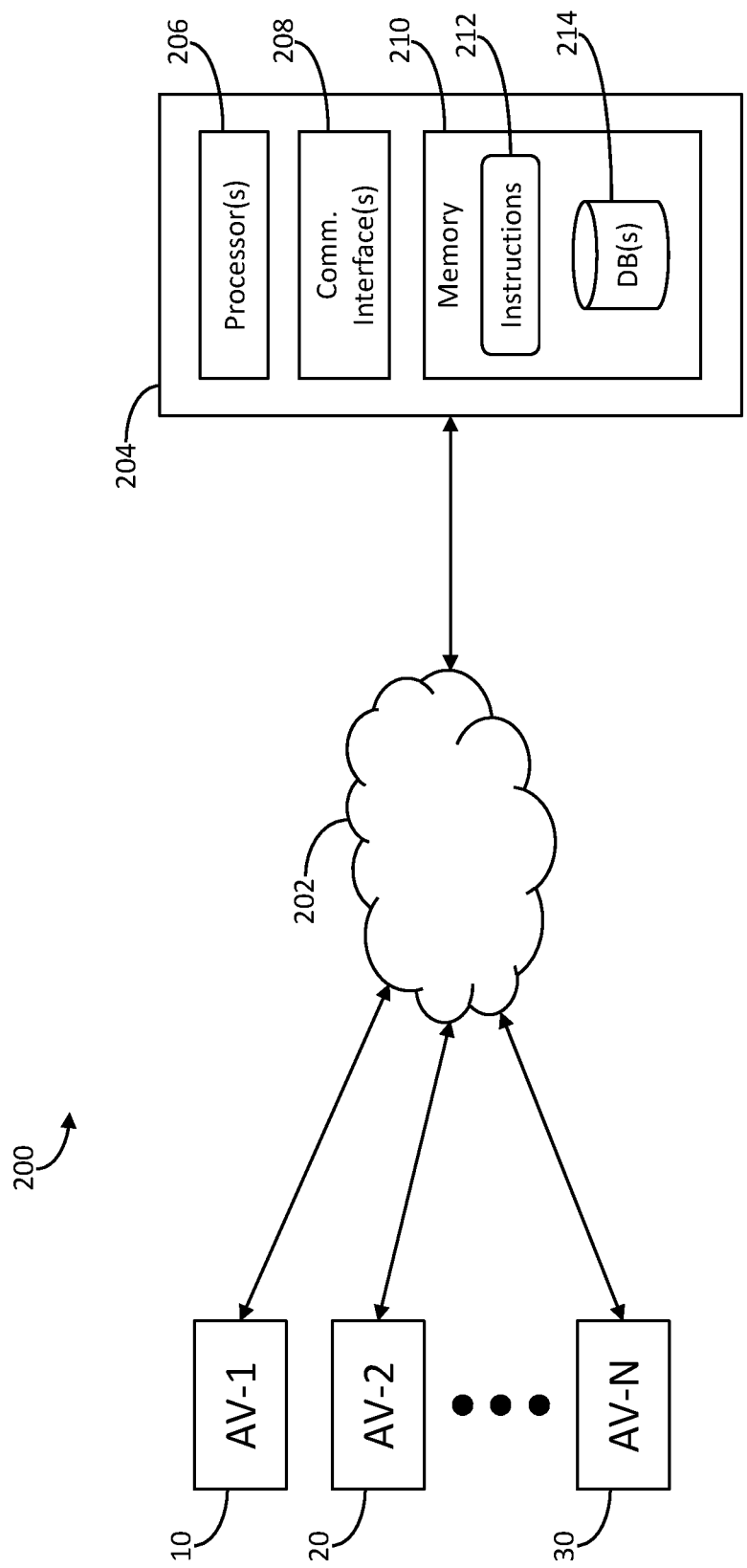
FIG. 2 depicts an example operating environment according to example embodiments of the present disclosure.

FIG. 2 depicts an example operating environment according to example embodiments of the present disclosure. Referring to FIG. 2, environment 200 can include one or more autonomous vehicles. For example, environment 200 can include autonomous vehicles 10, 20, and/or 30. It will be appreciated that autonomous vehicles 20 and/or 30 can include one or more of the components described above with respect to autonomous vehicle 10. In some embodiments, autonomous vehicles 10, 20, and/or 30 can be associated with one another (e.g., as part of a fleet, and/or the like). Environment 200 can also include one or more networks 202 and remotely located computing system 204. Network(s) 202 can include one or more networks (e.g., wired networks, wireless networks, and/or the like) that interface autonomous vehicles 10, 20, and/or 30 with one another and/or with remotely located computing system 204.

Remotely located computing system 204 can be geographically located at a location remote from autonomous vehicles 10, 20, and/or 30. As indicated above, in some embodiments, autonomous vehicles 10, 20, and/or 30 can be associated with one another, for example, as part of a fleet. In such embodiments, remotely located computing system 204 can be associated with the fleet (e.g., an operator of the fleet, a manufacturer of autonomous vehicles 10, 20, and/or 30 or one or more of their components, a software developer associated with the fleet, a third-party associated with the fleet, and/or the like).

Remotely located computing system 204 can include one or more processors 206, one or more communication interfaces 208, and memory 210. Communication interface(s) 208 can be configured to enable remotely located computing system 204 to communicate with autonomous vehicles 10, 20, and/or 30 (e.g., via network(s) 202, and/or the like). Memory 210 can include instructions 212, which when executed by processor(s) 206 can cause remotely located computing system 204 to perform one or more operations and/or functions described herein. Memory 210 can also include one or more databases 214, which can comprise data representing information described herein.

Figure 3:
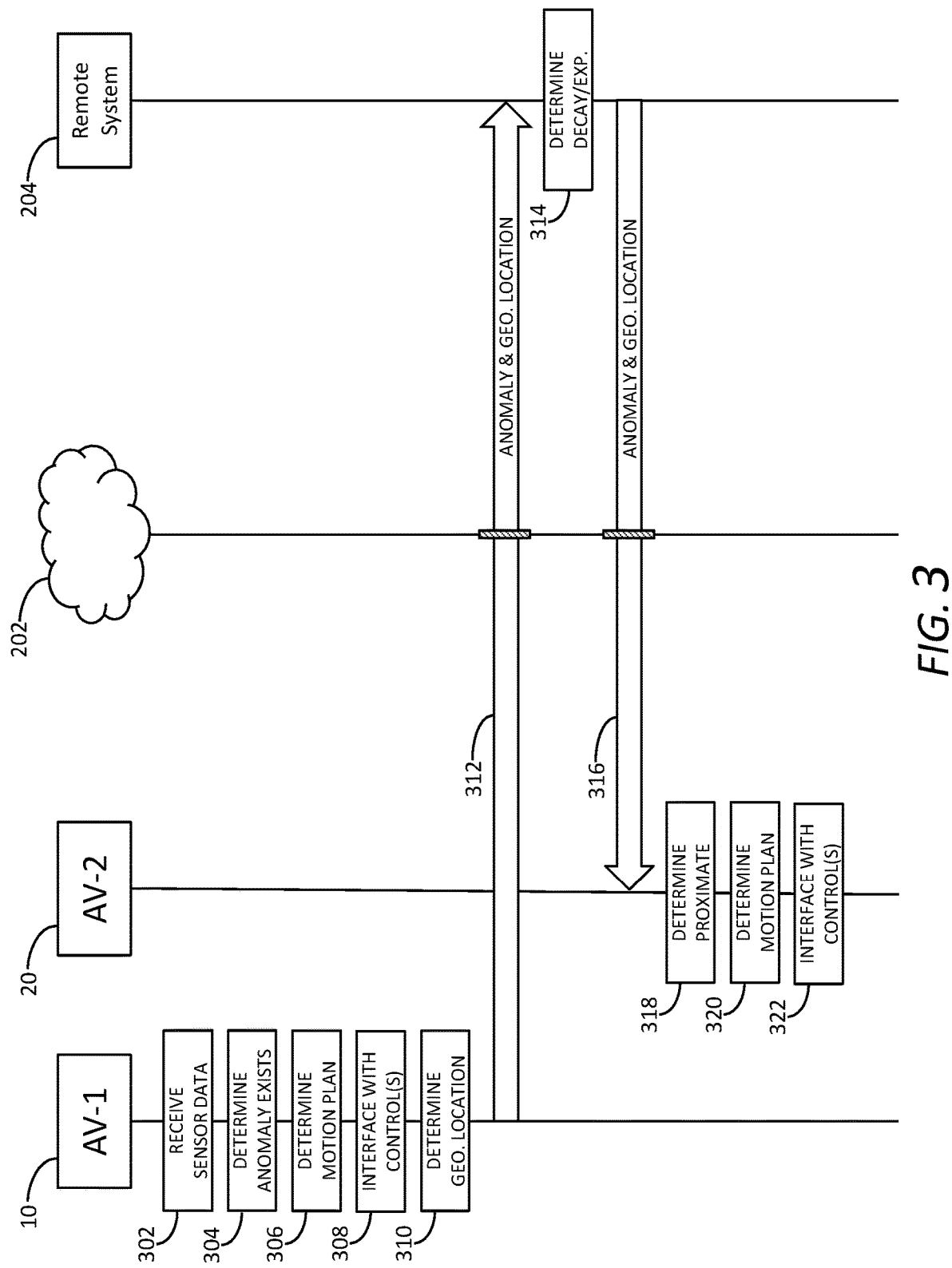
FIG. 3 depicts an example event sequence according to example embodiments of the present disclosure.

FIG. 3 depicts an example event sequence according to example embodiments of the present disclosure. Referring to FIG. 3, at (302), autonomy computing system 102 can receive data from sensor(s) 101. For example, in some embodiments, the data received from sensor(s) 101 can include a measured yaw rate of autonomous vehicle 10 (e.g., as determined by an IMU of autonomous vehicle 10, and/or the like). Additionally or alternatively, the data received from sensor(s) 101 can include speed data for one or more wheels of autonomous vehicle 10.

At (304), autonomy computing system 102 can determine that an anomaly exists in an interface between at least one tire of autonomous vehicle 10 and a road surface. For example, an anomaly can exist in an interface between a tire of autonomous vehicle 10 and a road surface that causes a reduced coefficient of friction to exist for the tire (e.g., due to gravel, sand, oil, water, ice, snow, and/or the like). Additionally or alternatively, an anomaly can exist in an interface between a tire of autonomous vehicle 10 and a road surface due to a wheel associated with the tire being locked up or spinning out, autonomous vehicle 10 hydroplaning, the tire being flat or underinflated, autonomous vehicle 10 striking a pothole or curb, a steering system of autonomous vehicle 10 being misaligned, a suspension system of autonomous vehicle 10 being mistuned, and/or the like.

As indicated above, in some embodiments, the data received from sensor(s) 101 can include a measured yaw rate of autonomous vehicle 10. In such embodiments, autonomy computing system 102 can be configured to obtain and/or determine (e.g., iteratively, repeatedly, continuously, and/or the like) a yaw-rate model for autonomous vehicle 10. The measured yaw rate can be compared to a yaw rate indicated by the yaw-rate model (e.g., a yaw rate indicated by the model corresponding to a time when the measured yaw rate was measured, and/or the like), and a difference between the measured yaw rate and the yaw rate indicated by the yaw-rate model can be determined. Autonomy computing system 102 can determine that an anomaly exists based on a determination that the difference between the measured yaw rate and the yaw rate indicated by the yaw-rate model exceeds a predetermined threshold.

In some embodiments, the yaw-rate model can be obtained and/or determined in accordance with the below formula. The model can be based on a bicycle model, for example, Ackerman steering with vehicle velocity and longitudinal acceleration adjustment terms. The model can assume no load transfer (e.g., constant normal forces on each wheel). Inputs to the model can include vehicle longitudinal velocity, road wheel angle (e.g., angle of wheels to longitudinal axis of vehicle), and/or measured vehicle yaw rate. Outputs of the model can include driver-intended vehicle yaw rate and/or achieved yaw-rate error.

$$r_{calc} = \frac{V_x * \tan(RW\ A)}{L + k_1 V_x^2 + k_2 V_x}$$

The yaw rate calculation can be performed in accordance with the below formula. $k_1$ (e.g., 0.0032), $k_2$ (e.g., −0.004), $k_3$ (e.g., 8), and/or L (e.g., 2.984 m) can correspond to design parameters. $k_3$ can correspond to a window size. The moving average can serve as a propagation delay. The window size can be small compared to the frequency content of the yaw-rate signal. This can result in negligible effect on the magnitude and can result in an effective slight delay of the signal.

$$r_{calc} = \text{movingAverage}(r_{calc}, k_3)$$

The yaw-rate error can be determined in accordance with one or more of the below formulas.

$$\Delta r = \text{movingAverage}(r_{meas} - r_{calc}, 40)$$

$$den = r_{calc}^w$$

$$r_{error} = \frac{\Delta r}{den} * 100\%$$

$$r_{error} = 0\ |_{v_x < 2}$$

40 can be a sample window (e.g., tuned for f=100 Hz clocking). den can be saturated with a low bound (e.g., of 8 deg/sec). As illustrated, the model can be applicable for significant forward velocities. w (e.g., 0.9) can be a weighting parameter for shaping the response to high versus low yaw rates. The weighting can relatively reduce the magnitude of the denominator for high yaw rate compared to low yaw rate. This can artificially increase the error for high magnitude yaw rate events in comparison to lower magnitude yaw rate events. This can allow a raising of the thresholds for detecting yaw rate mismatches that were producing too many false positives for the lower magnitude yaw rate events. A value (e.g., 0.9) can be selected for w so as to shape the error results just enough without excessively distorting the data.

A steering angle static correction can be determined in accordance with the below formula. A pinion steering angle reported in a vehicle data message can be processed to extract the proper road-wheel angle. This can be due to the steering angle being the angle of the steering wheel and there not being a one-to-one matching after applying the rack ratio. To determine the mapping, data sets from one or more autonomous vehicles at low speeds (e.g., to reduce the effects of wheel slip) can be fed into the yaw model to convert yaw rate to steering angle. $h_1$ can correspond to a rack ratio (e.g., 16.8). $h_2$ can correspond to a clamping gain for high angle region (e.g., 0.0003). $h_3$ can correspond to polynomial behavior of non-linear, high angle region (e.g., 2.6).

$$RW\ A_{corr} = \frac{\delta}{h_1} + h_2 * \left(\frac{\delta}{h_1}\right)^{h_3}$$

In some embodiments, a slip event can be identified in accordance with the below pseudo code.

flagYawRate1=|yawRateError|≥threshYawRate1 (e.g., 17)
flagYawRate2=|yawRateError|≥threshYawRate2 (e.g., 30)
condA=flagYawRate1 && (|latAccel|>1)
condB=flagYawRate2
condC=|latAccelCalc|>|latAccel|
flagModLimit=(condA||condB) && condC Responsive to determining that an anomaly exists, at (306), autonomy computing system 102 can determine a motion plan that takes into account the anomaly, and, at (308), autonomy computing system 102 can interface with vehicle control(s) 107 to implement the motion plan. For example, autonomy computing system 102 can determine a maximum lateral acceleration for autonomous vehicle 10 to prevent autonomous vehicle 10 from exceeding its frictional capabilities (e.g., of the tire for which the anomaly exists, and/or the like). Such a limit can: regenerate towards a predefined lateral acceleration limit, for example, for dry, clean, asphalt (e.g., experimentally determined to be ~8 m/s$^2$) in case reduced capability conditions have cleared (e.g., the vehicle is no longer hydroplaning, and/or the like); pulled down towards the interpreted maximum lateral acceleration available for current conditions; rise to an observed lateral acceleration of a larger magnitude than what the current limit is set to; and/or the like. For example, an updated lateral limit can be determined in accordance with the below pseudo code.

if(flagModLimit && (|latAccel|>latAccelLimit))//reduce limit
  newLim=|latAccel|
  α=0.05 (e.g., tunable weighting parameter for reduction)
elseif(|latAccel|>latLimit)//respond to observed lat accel>current limit
  newLim=|latAccelAct|
  α=0.2 (e.g., tunable weighting parameter for raising the limit)
else//slowly regenerate
  newLim=nominalLatLimit
  α=0.00008 (e.g., tunable weighting parameter for recovery)

An updated lateral limit recommendation can be determined in accordance with the below formula (e.g., a simple averaging filter using new and previous lateral limits).

latLimit=(1−α)*(latLimit)+α*(newLim)

A motion plan can be determined based on the maximum lateral acceleration, and autonomy computing system 102 can interface with vehicle control(s) 107 to implement the motion plan. In some embodiments, the motion plan can represent one or more simulated responses of a human driver to the anomaly.

As indicated above, in some embodiments, the data received from sensor(s) 101 can include speed data for one or more wheels of autonomous vehicle 10. In such embodiments, autonomy computing system 102 can be configured to determine wheel speeds for autonomous vehicle 10 based on the speed data (e.g., wheel counts from a vehicle data message, and/or the like), a curvature of a path of autonomous vehicle 10 (e.g., the wheel speeds can be adjusted for the curvature of the vehicle path, and/or the like), torque being applied to one or more axels of autonomous vehicle 10, a computed weighted average wheel speed, and/or the like. Autonomy computing system 102 can determine that an anomaly exists based on a determination of a deviation in wheel speed (e.g., of a wheel associated with the at least one tire, and/or the like).

In some embodiments, wheel slip can be identified by looking for an outlier wheel speed when compared to the other wheel speeds. For example, slip can be converted to the wheel speed difference from the weighted average speed in accordance with the below formula.

$$diffA = slipA_{corrected} * avgSpeed$$

The average speed can be a speed predicted by averaging over all wheels with a weighting factor, and the corrected slip can be the difference between a single wheel speed and the average speed, normalized by the average wheel speed, and then corrected with axle torque.

Variances of each set of three wheel speed differences can be determined in accordance with the below formula, which can be repeated for each wheel.

$$diffVarA = var(diffB, diffC, diffD)$$

A total variance of each of the individual variances can be determined in accordance with the below formula (e.g., identifying when one of the wheel speeds is significantly further from the weighted average speed than the other wheel speeds, and/or the like).

$$diffVarTotal = var(diffVarA, diffVarB, diffVarC, diffVarD)$$

Wheel slip can be identified by thresholding the total variance in accordance with the below formula.

$$flagWheelSlip = diffVarTotal > 4 \times 10^{-5}$$

Similarly, a flat or underinflated tire can have a higher rotational speed to compensate for its reduced radius, and autonomy computing system 102 can determine that a steady-state offset exists in the wheel speeds, suggesting a flat or underinflated tire (e.g., by looking for long-term wheel-speed offset, excluding influence from wheel slip, and/or the like). For example, a flat or underinflated tire can be identified in accordance with the below formulas.

$$Accel_X = \frac{\Delta Speed_X}{\Delta t}$$

frequency domain filter, cutoff frequency of 0.3 Hz $$Accel_X(V_x<2) = 0$$

$$diffAccel_X = Accel_X - Accel_{avg}$$

moving average filter, window length of 35 samples at 100 Hz $$maskAccel = any(|diffAccel_X| > 0.09)$$

$$maskSlip = any(|slipX_{corrected}| > 0.06)$$

$$diffX(maskSlip \| maskAccel) = 0$$

frequency domain filter, cutoff frequency 0.08 Hz $$flagWheelSize = any(diffX > 0.057)$$

Certain anomalies can potentially impact other autonomous vehicles (e.g., autonomous vehicles 20 and/or 30). For example, a reduced coefficient of friction (e.g., due to gravel, sand, oil, water, ice, snow, and/or the like) could impact other autonomous vehicles that encounter an associated underlying condition. Similarly, a determination that a wheel (e.g., associated with the at least one tire, and/or the like) locked up or spun out, that autonomous vehicle 10 hydroplaned, that autonomous vehicle 10 struck a pothole or curb, and/or the like could impact other autonomous vehicles. Accordingly, at (310), autonomy computing system 102 can determine a geographic location associated with the anomaly, and, at (312), autonomy computing system 102 can communicate (e.g., via network(s) 202, as depicted by the cross-hatched box over the line extending downward from network(s) 202) data indicating the anomaly and/or the geographic location to remotely located computing system 204.

Remotely located computing system 204 can receive the data from autonomous vehicle 10 and generate and/or store one or more records (e.g., in database(s) 214, and/or the like) indicating the anomaly, the geographic location, and/or the like. For example, the data can indicate autonomous vehicle 10 experienced a reduced coefficient of friction (e.g., due to ice, and/or the like) at a particular geographic location (e.g., associated with specified geographic coordinates, and/or the like), and remotely located computing system 204 can generate and/or store one or more records indicating that autonomous vehicle 10 experienced the reduced coefficient of friction at the particular geographic location. At (314), remotely located computing system 204 can determine a decay factor (e.g., a rate at which the data will progress to an invalid status, and/or the like) and/or an expiration date (e.g., a time at which the data will no longer be considered valid, and/or the like) for the anomaly and/or the geographic location and can store this data in the record(s) as well, configure the record(s) accordingly, and/or the like.

As indicated above, other autonomous vehicle(s) (e.g., autonomous vehicle 20) could be impacted by the anomaly. Accordingly, at (316), remotely located computing system 204 can communicate data indicating the anomaly and/or the geographic location to autonomous vehicle 20 (e.g., as part of a software update, via an over-the-air update, in response to autonomous vehicle 20 being routed to a location that comprises the geographic location associated with the anomaly, and/or the like).

Autonomous vehicle 20 (e.g., an autonomy computing system of autonomous vehicle 20) can receive the data indicating the anomaly and/or the geographic location. At (318), autonomous vehicle 20 (e.g., an autonomy computing system of autonomous vehicle 20) can determine that autonomous vehicle 20 is proximate to the geographic location. Responsive to determining that it is proximate to the geographic location, at (320), autonomous vehicle 20 (e.g., an autonomy computing system of autonomous vehicle 20) can determine a motion plan that takes into account the anomaly, and, at (322), autonomous vehicle 20 (e.g., an autonomy computing system of autonomous vehicle 20) can interface with one or more vehicle controls of autonomous vehicle 20 to implement the motion plan. For example, autonomous vehicle 20 can determine that it is proximate to the geographic location where autonomous vehicle 10 determined an anomaly existed (e.g., experienced a reduced coefficient of friction, and/or the like), can determine a motion plan that takes into account the anomaly (e.g., can determine a maximum lateral acceleration to prevent it from exceeding its friction capabilities in light of a condition (e.g., ice and/or the like) underlying the reduced coefficient of friction previously experienced by autonomous vehicle 10, and/or the like), and can interface with one or more of its vehicle controls to implement the motion plan.

Figure 4:
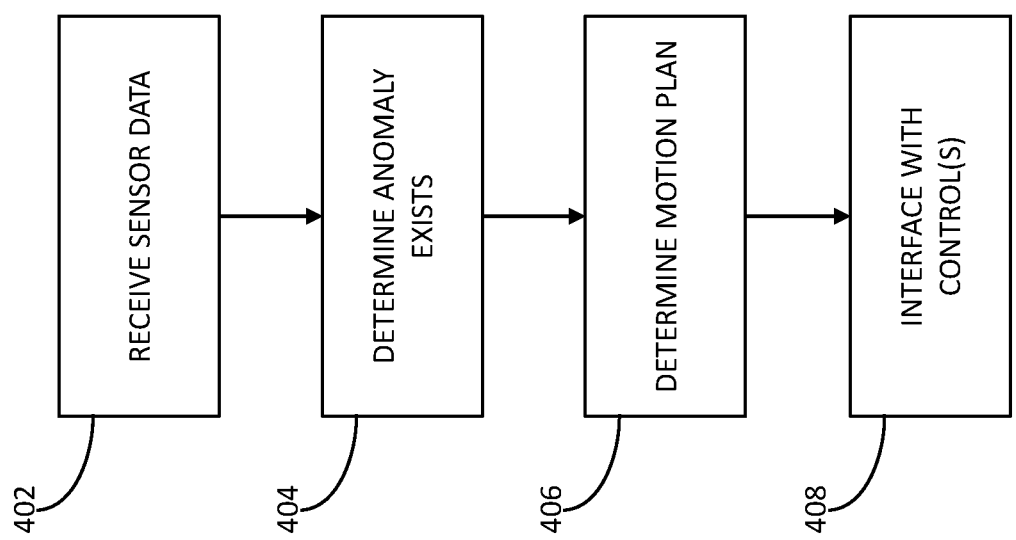
FIGS. 4, 5, and 6 depict example methods according to example embodiments of the present disclosure.
Figure 5:
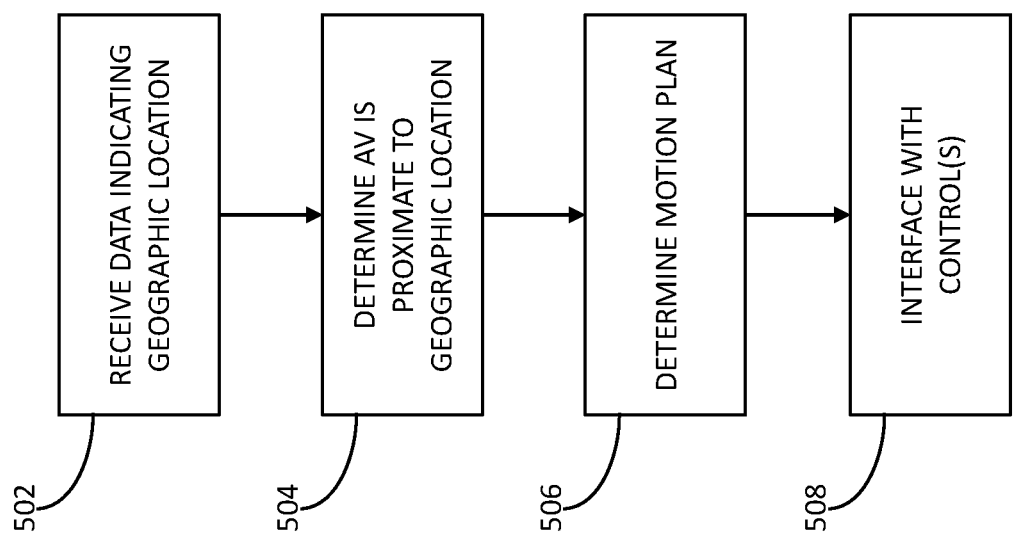
Figure 6:
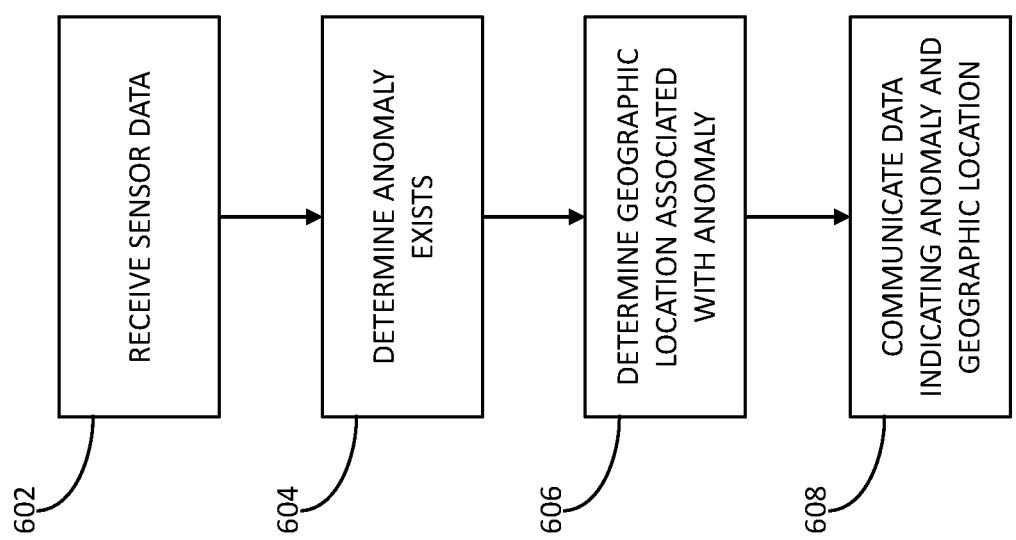

FIGS. 4, 5, and 6 depict example methods according to example embodiments of the present disclosure.

Referring to FIG. 4, at (402), data can be received from one or more sensors of an autonomous vehicle. For example, autonomy computing system 102 can receive data from sensor(s) 101. At (404), an anomaly can be determined to exist in an interface between at least one tire of the autonomous vehicle and a road surface. For example, autonomy computing system 102 can determine (e.g., based on the data received from sensor(s) 101) that an anomaly exists in an interface between at least one tire of autonomous vehicle 10 and a road surface. At (406), a motion plan for the autonomous vehicle that takes into account the anomaly can be determined. For example, autonomy computing system 102 can determine a motion plan that takes into account the anomaly in the interface between the at least one tire of autonomous vehicle 10 and the road surface. At (408), one or more controls of the autonomous vehicle can be interfaced with to implement the motion plan. For example, autonomy computing system 102 can interface with vehicle control(s) 107 to implement the motion plan.

Referring to FIG. 5, at (502), an autonomous vehicle can receive, from a remotely located computing system, data indicating a geographic location at which a different autonomous vehicle determined that an anomaly existed in an interface between at least one tire of the different autonomous vehicle and a road surface associated with the geographic location. For example, autonomous vehicle 20 (e.g., an autonomy computing system of autonomous vehicle 20) can receive, from remotely located computing system 204, data indicating a geographic location at which autonomous vehicle 10 (e.g., autonomy computing system 102) determined that an anomaly existed in an interface between at least one tire of autonomous vehicle 10 and a road surface associated with the geographic location. At (504), the autonomous vehicle can determine it is proximate to the geographic location. For example, autonomous vehicle 20 (e.g., an autonomy computing system of autonomous vehicle 20) can determine autonomous vehicle 20 is proximate to the geographic location indicated by the data received from remotely located computing system 204. At (506), the autonomous vehicle can determine a motion plan for the autonomous vehicle that takes into account the anomaly. For example, autonomous vehicle 20 (e.g., an autonomy computing system of autonomous vehicle 20) can determine a motion plan for autonomous vehicle 20 that takes into account the anomaly indicated by the data received from remotely located computing system 204. At (508), one or more controls of the autonomous vehicle can be interfaced with to implement the motion plan. For example, autonomous vehicle 20 (e.g., an autonomy computing system of autonomous vehicle 20) can interface with one or more vehicle controls of autonomous vehicle 20 to implement the motion plan for autonomous vehicle 20 that takes into account the anomaly indicated by the data received from remotely located computing system 204.

Referring to FIG. 6, at (602), data can be received from one or more sensors of an autonomous vehicle. For example, autonomy computing system 102 can receive data from sensor(s) 101. At (604), an anomaly can be determined to exist in an interface between at least one tire of the autonomous vehicle and a road surface. For example, autonomy computing system 102 can determine (e.g., based on the data received from sensor(s) 101) that an anomaly exists in an interface between at least one tire of autonomous vehicle 10 and a road surface. At (606), a geographic location of the autonomous vehicle associated with the anomaly can be determined. For example, autonomy computing system 102 can determine a geographic location of autonomous vehicle 10 associated with the anomaly. At (608), data indicating the anomaly and the geographic location of the autonomous vehicle associated with the anomaly can be communicated to a remotely located computing system. For example, autonomy computing system 102 can communicate data indicating the anomaly and the geographic location of autonomous vehicle 10 associated with the anomaly to remotely located computing system 204.

The technology discussed herein makes reference to servers, databases, software applications, and/or other computer-based systems, as well as actions taken and information sent to and/or from such systems. The inherent flexibility of computer-based systems allows for a great variety of possible configurations, combinations, and/or divisions of tasks and/or functionality between and/or among components. For instance, processes discussed herein can be implemented using a single device or component and/or multiple devices or components working in combination. Databases and/or applications can be implemented on a single system and/or distributed across multiple systems. Distributed components can operate sequentially and/or in parallel.

Various connections between elements are discussed in the above description. These connections are general and, unless specified otherwise, can be direct and/or indirect, wired and/or wireless. In this respect, the specification is not intended to be limiting.

The depicted and/or described steps are merely illustrative and can be omitted, combined, and/or performed in an order other than that depicted and/or described; the numbering of depicted steps is merely for ease of reference and does not imply any particular ordering is necessary or preferred.

The functions and/or steps described herein can be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (RAM), or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field-programmable gate arrays (FPGAs), or the like. Particular data structures can be used to more effectively implement one or more aspects of the disclosure, and such data structures are contemplated to be within the scope of computer-executable instructions and/or computer-usable data described herein.

Although not required, one of ordinary skill in the art will appreciate that various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and acts can be operative across one or more computing devices and/or networks. The functionality can be distributed in any manner or can be located in a single computing device (e.g., server, client computer, user device, or the like).

Aspects of the disclosure have been described in terms of illustrative embodiments thereof. Numerous other embodiments, modifications, and/or variations within the scope and spirit of the appended claims can occur to persons of ordinary skill in the art from a review of this disclosure. For example, one or ordinary skill in the art can appreciate that the steps depicted and/or described can be performed in other than the recited order and/or that one or more illustrated steps can be optional and/or combined. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method comprising:
    determining, by a computing system comprising one or more computing devices and based on data received from one or more sensors of an autonomous vehicle, that an anomaly exists in an interface between at least one tire of the autonomous vehicle and a road surface, wherein the data received from the one or more sensors comprises a measured yaw rate of the autonomous vehicle received from an inertial motion unit (IMU) of the autonomous vehicle, and wherein determining that the anomaly exists comprises:
        obtaining a yaw-rate model for the autonomous vehicle,
        determining a difference between the measured yaw rate and a yaw rate indicated by the yaw-rate model, and
            determining that the difference between the measured yaw rate and the yaw rate indicated by the yaw-rate model exceeds a predetermined threshold; and
    responsive to determining that the anomaly exists:
        determining, by the computing system, a motion plan for the autonomous vehicle that takes into account the anomaly; and
        interfacing, by the computing system, with one or more controls of the autonomous vehicle to implement the motion plan.

2. The computer-implemented method of claim 1, wherein determining the motion plan comprises determining a motion plan representing one or more simulated responses of a human driver to the anomaly.

3. The computer-implemented method of claim 1, wherein:
    the data received from the one or more sensors comprises speed data for a plurality of wheels of the autonomous vehicle; and
    determining that the anomaly exists comprises:
        determining, based on (i) the speed data for the plurality of wheels, (ii) a curvature of a path of the autonomous vehicle, and (iii) torque being applied to one or more axels of the autonomous vehicle, wheel speeds for the plurality of wheels; and
        determining, based on the wheel speeds for the plurality of wheels, a deviation in a wheel speed to the at least one tire.

4. The computer-implemented method of claim 1, wherein determining the motion plan comprises:
    determining, based on the data received from the one or more sensors, a maximum lateral acceleration for the autonomous vehicle to prevent the autonomous vehicle from exceeding frictional capabilities of the at least one tire; and
    determining, based on the maximum lateral acceleration, the motion plan.

5. The computer-implemented method of claim 1, comprising, responsive to determining that the anomaly exists:
    determining, by the computing system, a geographic location of the autonomous vehicle associated with the anomaly; and
    communicating, by the computing system and to a remotely located computing system, data indicating the anomaly and the geographic location.

6. The computer-implemented method of claim 5, comprising:
    receiving, by one or more computing devices of a different autonomous vehicle and from the remotely located computing system, data indicating the anomaly and the geographic location; and
    responsive to determining, by the one or more computing devices of the different autonomous vehicle, that the different autonomous vehicle is proximate to the geographic location, determining, by the one or more computing devices of the different autonomous vehicle, a motion plan for the different autonomous vehicle that takes into account the anomaly.

7. The computer-implemented method of claim 1, wherein determining that the anomaly exists comprises determining at least one of that a reduced coefficient of friction exists for the at least one tire, that a wheel associated with the at least one tire is locked up, that a wheel associated with the at least one tire is spinning out, that the autonomous vehicle is hydroplaning, that the at least one tire is flat, that the at least one tire is underinflated, that the autonomous vehicle has struck a pothole, that the autonomous vehicle has struck a curb, that a steering system of the autonomous vehicle is misaligned, or that a suspension system of the autonomous vehicle is mistuned.

8. A computer-implemented method comprising:
    receiving, by a computing system of an autonomous vehicle and from a remotely located computing system, data indicating a geographic location at which a different autonomous vehicle determined that an anomaly existed in an interface between at least one tire of the different autonomous vehicle and a road surface associated with the geographic location; and
    responsive to determining, by the computing system of the autonomous vehicle, that the autonomous vehicle is proximate to the geographic location:

determining, by the computing system of the autonomous vehicle, a motion plan for the autonomous vehicle that takes into account the anomaly, wherein determining the motion plan comprises determining, based on the data, a maximum lateral acceleration for the autonomous vehicle to prevent the autonomous vehicle from exceeding frictional capabilities of at least one tire of the autonomous vehicle and determining, based on the maximum lateral acceleration, the motion plan; and interfacing, by the computing system of the autonomous vehicle, with one or more controls of the autonomous vehicle to implement the motion plan.

9. The computer-implemented method of claim 8, wherein determining the motion plan comprises determining a motion plan representing one or more simulated responses of a human driver to the anomaly.

10. The computer-implemented method of claim 8, wherein the data indicates the different autonomous vehicle determined at least one of that a reduced coefficient of friction existed for the at least one tire, that a wheel associated with the at least one tire locked up, that a wheel associated with the at least one tire spun out, that the different autonomous vehicle hydroplaned, that the different autonomous vehicle struck a pothole, or that the different autonomous vehicle struck a curb.

11. A computer-implemented method comprising:
determining, by a computing system comprising one or more computing devices and based on data received from one or more sensors of an autonomous vehicle, that an anomaly exists in an interface between at least one tire of the autonomous vehicle and a road surface, wherein determining that the anomaly exists comprises determining at least one of that a reduced coefficient of friction exists for the at least one tire, that a wheel associated with the at least one tire is locked up, that a wheel associated with the at least one tire is spinning out, that the autonomous vehicle is hydroplaning, that the autonomous vehicle has struck a pothole, or that the autonomous vehicle has struck a curb; and responsive to determining that the anomaly exists, communicating, by the computing system, to a remotely located computing system, and for use by a different autonomous vehicle in generating a motion plan that takes into account the anomaly, data indicating the anomaly and a geographic location of the autonomous vehicle associated with the anomaly.

12. The computer-implemented method of claim 11, wherein:
the data received from the one or more sensors comprises a measured yaw rate of the autonomous vehicle received from an inertial motion unit (IMU) of the autonomous vehicle; and
determining that the anomaly exists comprises:
obtaining a yaw-rate model for the autonomous vehicle;
determining a difference between the measured yaw rate and a yaw rate indicated by the yaw-rate model; and
determining that the difference between the measured yaw rate and the yaw rate indicated by the yaw-rate model exceeds a predetermined threshold.

13. The computer-implemented method of claim 11, wherein:
the data received from the one or more sensors comprises speed data for a plurality of wheels of the autonomous vehicle; and
determining that the anomaly exists comprises:
determining, based on (i) the speed data for the plurality of wheels, (ii) a curvature of a path of the autonomous vehicle, and (iii) torque being applied to one or more axels of the autonomous vehicle, wheel speeds for the plurality of wheels; and
determining, based on the wheel speeds for the plurality of wheels, a deviation in a wheel speed to the at least one tire.

14. The computer-implemented method of claim 11, comprising:
receiving, by one or more computing devices of the different autonomous vehicle and from the remotely located computing system, data indicating the anomaly and the geographic location; and
responsive to determining, by the one or more computing devices of the different autonomous vehicle, that the different autonomous vehicle is proximate to the geographic location:
determining, by the one or more computing devices of the different autonomous vehicle, the motion plan that takes into account the anomaly; and
interfacing, by the one or more computing devices of the different autonomous vehicle, with one or more controls of the different autonomous vehicle to implement the motion plan.

15. The computer-implemented method of claim 14, wherein determining the motion plan comprises determining a motion plan representing one or more simulated responses of a human driver to the anomaly.

16. The computer-implemented method of claim 14, wherein determining the motion plan comprises:
determining a maximum lateral acceleration for the different autonomous vehicle to prevent the different autonomous vehicle from exceeding frictional capabilities of at least one tire of the different autonomous vehicle; and
determining, based on the maximum lateral acceleration, the motion plan.

17. The computer-implemented method of claim 11, comprising:
receiving, by the remotely located computing system, the data indicating the anomaly and the geographic location; and
determining, by the remotely located computing system and based on the data indicating the anomaly and the geographic location, at least one of a decay factor for the anomaly or an expiration date for the anomaly.

* * * * *